United States Patent [19]

Baker

[11] Patent Number: 5,714,876
[45] Date of Patent: Feb. 3, 1998

[54] IN-SERVICE SERIAL DIGITAL SOURCE SIGNAL-LEVEL AND CABLE-LENGTH MEASUREMENT

[75] Inventor: Daniel G. Baker, Aloha, Oreg.

[73] Assignee: Tektronix, Inc., Wilsonville, Oreg.

[21] Appl. No.: 639,065

[22] Filed: Apr. 24, 1996

[51] Int. Cl.$^6$ ................................................. G01R 23/14
[52] U.S. Cl. .................... 324/76.42; 324/76.41; 324/76.44
[58] Field of Search .......................... 324/76.15, 76.24, 324/76.31, 76.38, 76.41, 76.42, 76.44, 76.46, 76.47, 76.51

[56] References Cited

U.S. PATENT DOCUMENTS

| 4,135,243 | 1/1979 | Peregrino et al. | 324/76.42 X |
| 4,504,786 | 3/1985 | Slaughter | 324/76.41 |
| 4,568,878 | 2/1986 | Bales | 324/76.41 |
| 5,019,823 | 5/1991 | Bream et al. | 324/76.42 X |

Primary Examiner—Glenn W. Brown
Attorney, Agent, or Firm—Francis I. Gray

[57] ABSTRACT

An in-service cable length and source signal level measurement system uses a simple, zero-IF superheterodyne receiver tuned to only two reference frequencies to generate samples of a serial digital signal at each of the two frequencies. The samples at the two frequencies are input to a processor that calculates the cable length and source signal level as a function of the samples so obtained and cable dependent constants. The samples in units of decibels are subtracted to obtain a loss differential between the samples at the two reference frequencies, and then scaled by a cable dependent scale factor to obtain the length of the cable independent of source signal level and temperature. The source signal level is extrapolated from the loss differential and one of the samples based upon a nominal source amplitude and the cable dependent constants.

7 Claims, 1 Drawing Sheet

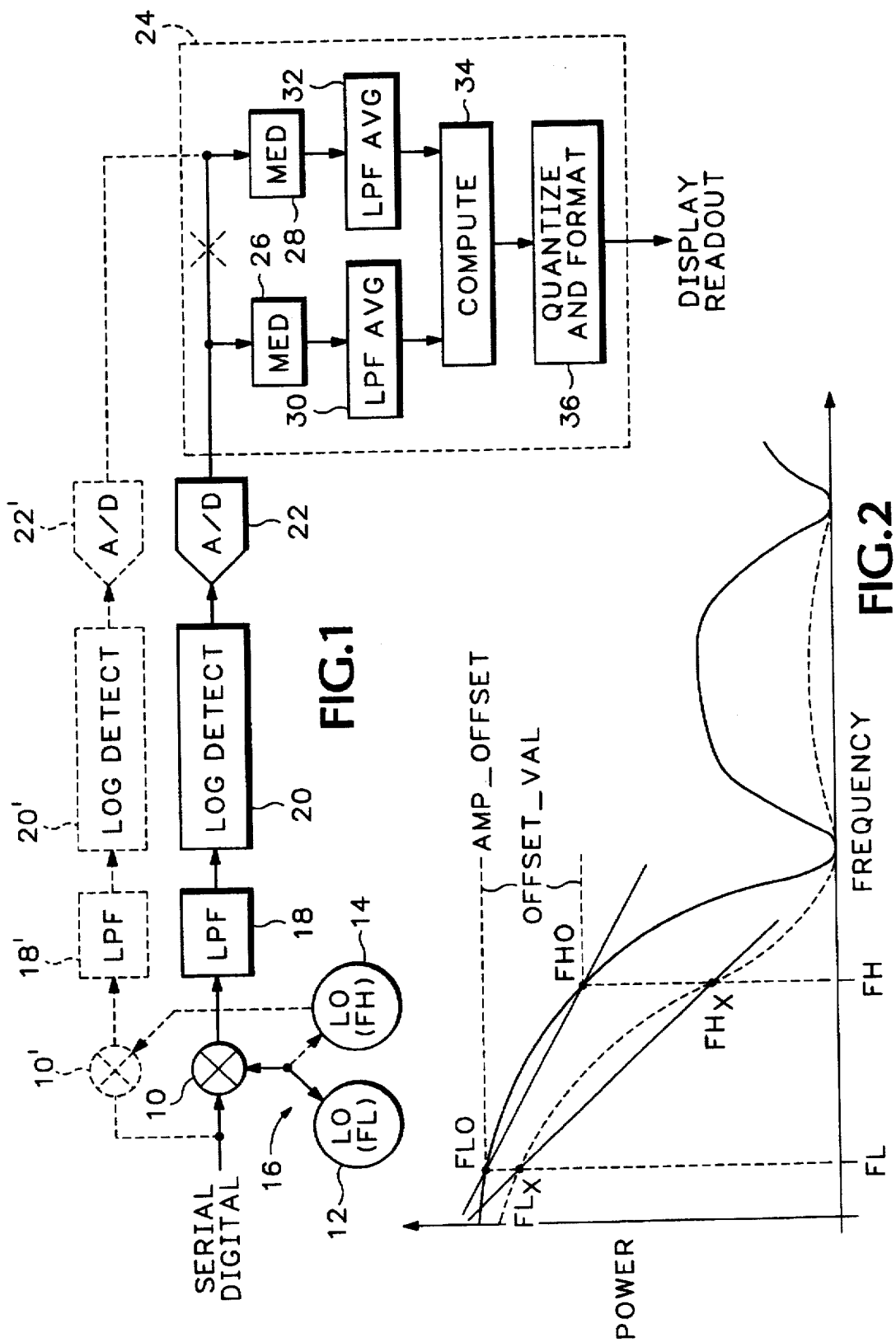

5,714,876

IN-SERVICE SERIAL DIGITAL SOURCE SIGNAL-LEVEL AND CABLE-LENGTH MEASUREMENT

BACKGROUND OF THE INVENTION

The present invention relates to serial digital data transmission measurements, and more particularly to in-service serial digital source signal-level and cable-length/cable-loss measurements.

Digital data transmission and, in particular serial digital video distribution, offers the advantage of near perfect reconstruction of information after many passes of detection and retransmission. One serious disadvantage, however, is that some channel modulation/detection methods offer no early warning when the channel characteristics have exceeded the threshold of reliable data recovery. This is particularly true of the serial digital video standard for sending data over a 75 ohm coaxial cable. This characteristic has been dubbed the "cliff effect" and can cause near perfect data transmission to degrade severely with only a slight increase in cable length or change in source signal level.

Therefore what is desired is a method of in-service monitoring of the cable length coupled to the source and of the signal level of distributed serial digital signals to determine the remaining margin before the signal quality "falls off the cliff."

SUMMARY OF THE INVENTION

Accordingly the present invention provides in-service serial digital source signal-level and cable-length/cable-loss measurements that determine the remaining margin before near perfect data transmission degrades severely. A serial digital signal is input to a simple, zero-IF, superheterodyne receiver that is tuned to only two reference frequencies. The resulting log-weighted samples in dBs at both frequencies are processed along different paths to obtain filtered low frequency values and filtered high frequency, values. These values are subtracted to obtain a differential loss which is modified by an offset value determined from a zero cable length determination. The differential loss in dB is multiplied by a scale factor in meters per dB, which scale factor is a function of the cable type, to produce the cable length for the known type cable or for an equivalent cable length in the known common type cable where the cable type is unknown. The source amplitude is extrapolated backwards from one of the filtered frequency, values and the differential loss. Using a nominal source signal amplitude and the manufacturer's specified cable characteristics, the cable-length and signal-level measurements indicate the remaining cable-length and signal-level margin in a system before significant signal degradation occurs.

The objects, advantages and other novel features of the present invention are apparent from the following detailed description when read in conjunction with the appended claims and attached drawing.

BRIEF DESCRIPTION OF THE DRAWING

FIG. 1 is a block diagram view of a receiver for performing in-service serial digital source signal level and cable length measurements according to the present invention.

FIG. 2 is a graphic view of signal processing for performing in-service serial digital source signal level and cable length measurements according to the present invention.

DESCRIPTION OF THE PREFERRED EMBODIMENT

Referring now to FIG. 1 a serial digital signal, such as scrambled non-return to zero, inverted (NRZI), is input to a simple, zero-IF superheterodyne receiver that is tuned to only two reference frequencies FL, FH. The signal is input to a mixer 10. A pair of local oscillators 12, 14 provide the reference frequencies, such as 10 MHz [FL] and 77 MHZ [FH], respectively. A switch 16 selectively couples the frequency output from one of the local oscillators 12, 14 to the mixer 10. The output from the mixer 10 is input to a lowpass filter 18 having a relatively narrow passband, such as 2 MHz, to filter the output from the mixer from near DC to 2 Mhz. The filter 18 could also be an I.F. bandpass filter as in a conventional superheterodyne receiver. However, the resulting wider image spread would either have to be removed by an input preselector or taken into account in the measurement. This 2 MHz, zero-IF signal from the filter 18 is input to a log detector/amplifier 20 so that the large dynamic range of the detected signal is compressed and detected in one step and so that the desired signal power ratios are more easily computed as simple additions and subtractions. The output from the log detector 20 is digitized by an analog to digital converter 22 using a system clock, such as a 100 Hz clock or more, to allow subsequent digital signal processing while updating the display at a reasonable rate. Using the switch 16, after each A/D sample the local oscillators 12, 14 are switched as inputs to the mixer 10. This produces alternating low and high frequency samples FLx, FHx at the output of the A/D converter 22.

The samples from the A/D converter 22 are input to a processor 24 which has two initial data paths, one for the low frequency samples and the other for the high frequency samples. Both sets of samples are processed initially by respective median filters 26, 28 to eliminate errors caused by ephemeral data dropouts, since due to insufficient scrambling of the NRZI signal the spectrum is not fully data independent and occasional dropouts in the detected, log-weighted output occur. Then the median filtered sets of samples are input to respective lowpass averaging filters 30, 32 as floating point data to afford a resolution substantially better than the one least significant bit limit of the A/D converter 22. The filtered low and high frequency values FLFVal, FHFVal are input to a computational algorithm 34 which computes the signal level and/or cable length. The computational output is input to a quantizer/format algorithm 36 to provide a display readout which is provided to an appropriate output device, such as a display device, a printer, a remote port or the like.

The computational algorithm 34 takes advantage of the characteristics of a serial digital signal. As shown in FIG. 2 the logarithmic plot of the power spectrum of such a signal is described by the following function:

$$S_{xx} = (\sin(w)/w)^2 = \sin c^2(w).$$

At zero cable length the low frequency power value is given by FL0 and the high frequency power value is given by FH0 which defines a slope. The values of the low and high frequencies for the local oscillators 12, 14 are chosen to fall within the first lobe of the Sxx function. The separation between the two frequencies is chosen to provide a good slope variation for sufficient resolution and limited dynamic range for the measurements. The difference between these two zero length values provides an Offset Value, which is due to the roll-off in the spectral output of the signal source and the small gain inequality of the receiver at the two frequencies. When cable length is added, the loss introduced by the cable alters the power spectrum so that the corresponding low and high frequency values FLx, FHx (where x is the unknown cable length) are attenuated and the slope defined by the values changes. These changes occur in a linear manner on the log weighted Sxx function. Therefore by having some standard cable length values stored in the computational algorithm 34 at the respective frequencies, such as the values at the respective frequencies for 100 meters of Beldon 8281 cable, the cable length x may be determined. The measured frequency-differential loss value is independent of mixer 10 and log detector 20 gain variations as well as source signal level. This differential loss characteristic is consistent with temperature and varying batches of a given cable type even though the absolute loss may change a great deal. Therefore, accurate cable loss, type identification or length measurements may be made over a wide range of temperature and signal levels.

An incremental cable loss LossVar in dBs is determined as follows:

$$LossVar = FLFVal - FHFVal - OffsetVal$$

which determines the incremental cable length loss in dB between the two reference frequencies. The cable length x is then determined by:

$$x = LossVar * ScaleFactor$$

where ScaleFactor in meters per dB converts the cable dependent loss to cable length. The ScaleFactor is cable dependent and is determined by each cable type from published data or measured directly with the receiver of FIG. 1 on a known cable length.

To determine the signal level or source amplitude SL, the following is used:

$$SL = (ScaleFactor * CblK)(FLFVal - AmpOffset + K(LossVar))$$

where CblK in dB/meter combined with the ScaleFactor produces a dimensionless gain constant. AmpOffset in dB calibrates out receiver gain and cable length at a nominal source amplitude of, for example, 0 dB when connected to an amplitude calibrated signal source and is not dependent on the cable type, and K is a cable dependent factor (less than one) to add back the length dependent cable loss, i.e., to zero out the drop in FLFVal due to non-zero cable lengths rather than to source signal-levels. Unlike the cable length calculation, the receiver gain needs to be stable over temperature for accurate results.

A typical application for the present receiver is for use during installation of serial digital cable routes. Any serial digital source may be used and any unknown routing lengths may be checked to verify that sufficient margin exists. As an in-service monitor the cable length may be continuously monitored as well as the source signal amplitude. As additional equipment and cable routes are put into place, this assures proper installation. For example the link may be operating without error but, if the signal level or cable readout is vastly different than expected, this is a strong indication that an improper cable type or source amplitude has been connected and any small change may cause the signal to "fall off" the error threshold cliff.

Several operating modes are useful for the present receiver. The display may be simply in terms of cable loss for loss margin monitoring in general applications where a plurality of unknown cable types are used. However the typical case for serial digital video data is that a television studio is muted with a single, known cable type and a product incorporating the present receiver allows the user to select that type from a menu accurately scaling the loss measurement to cable length and allowing source signal amplitude monitoring.

In a special case where several unknown cable types are connected in series for a serial digital route, the cable length readout may be set for a commonly used cable type and the route measured in terms of equivalent meters of that cable type. This is especially useful since the performance of serial digital broadcast equipment is often specified to work up to a certain length of a specified, common cable type. Under this condition the user connects a signal generator with a calibrated output amplitude and the K factor is auto-set, allowing accurate source signal level monitoring and equivalent cable length for the unknown link with mixed or unknown cable types.

Referring back to FIG. 1 a parallel alternative embodiment for the receiver is also shown. A second mixer 10', filter 18', log detector 20' and A/D convert 22' path also has the serial digital signal as an input. The switch 16 is eliminated and the local oscillators 12, 14 are coupled separately to the respective mixers 10, 10' so that one path provides the low frequency samples and the other path the high frequency samples. These low and high frequency samples are input separately to the respective median filters 26, 28 of the processor 24. The processing is the same as discussed above within the processor 24.

Thus the present invention provides an in-service cable length and source signal level measurement capability in the form of a simple, zero-IF superheterodyne receiver coupled with a computational algorithm in a processor to linearly determine actual or equivalent cable length independent of some level, temperature or other variables, as well as to determine source signal level by extrapolating back from the determined cable length, in order to identify when cable-length or signal-level margins are being approached that may result in serious degradation of the serial digital signal.

What is claimed is:

1. An in-service serial digital measurement system coupled at one end of a cable, the cable being coupled at the other end to a source of a serial digital signal, comprising:
   means for obtaining a pair of samples from the serial digital signal, one at each of two reference frequencies within the first lobe of a power spectrum for the serial digital signal; and
   means for processing the pair of samples to determine a desired measurement for the cable/source based upon cable dependent constants.

2. The system as recited in claim 1 wherein the obtaining means comprises a zero-IF, superheterodyne receiver that has the serial digital signal as an input and tunes to the two frequencies to output the pair of samples.

3. The system as recited in claim 2 wherein the superheterodyne receiver comprises:
   a mixer coupled to receive the serial digital signal and a local oscillator signal to provide an intermediate frequency signal;
   means for alternating the frequency of the local oscillator signal between the two frequencies so that the intermediate frequency signal alternates between the two frequencies;
   means for converting the intermediate frequency signal to near DC; and
   means for sampling the intermediate frequency signal for each of the two frequencies to produce the pair of samples.

4. The system as recited in claim 3 wherein the sampling means comprises:
   means for log detecting the intermediate frequency signal to produce a logarithmic intermediate frequency signal; and means for converting the logarithmic intermediate frequency signal into a digital signal representing the pair of samples.

5. The system as recited in claim 1 wherein the processing means comprises:

means for filtering the pair of samples to generate a filtered low frequency sample and a filtered high frequency sample; and means for calculating the cable length and the signal level for the source as a function of the difference between the filtered low and high frequency samples and cable dependent constants.

6. A method of in-service measurement of cable-length for a cable coupled at one end to a source of a serial digital signal comprising the steps of:

obtaining a pair of samples from the serial digital signal at the other end of the cable, one sample at each of two reference frequencies within the first lobe of a power spectrum for the serial digital signal;

determining a cable loss for the cable based upon the pair of samples and an offset value representing a zero length cable; and converting the cable loss into the cable length measurement based upon a known type cable constant.

7. A method of in-service measurement of signal level for a source of a serial digital signal from one end of a cable, the other end of the cable being coupled to the source, comprising the steps of:

obtaining a pair of samples from the serial digital signal at the one end of the cable, one sample at each of two reference frequencies within the first lobe of a power spectrum for the serial digital signal;

determining a cable loss for the cable based upon the pair of samples and an offset value representing a zero length cable; and converting the cable loss to the source level measurement as a function of cable dependent constants based upon a nominal source amplitude.

* * * * *